March 11, 1952     B. W. SWANSON     2,588,586
SCREW THREAD COMPARATOR
Filed June 8, 1949
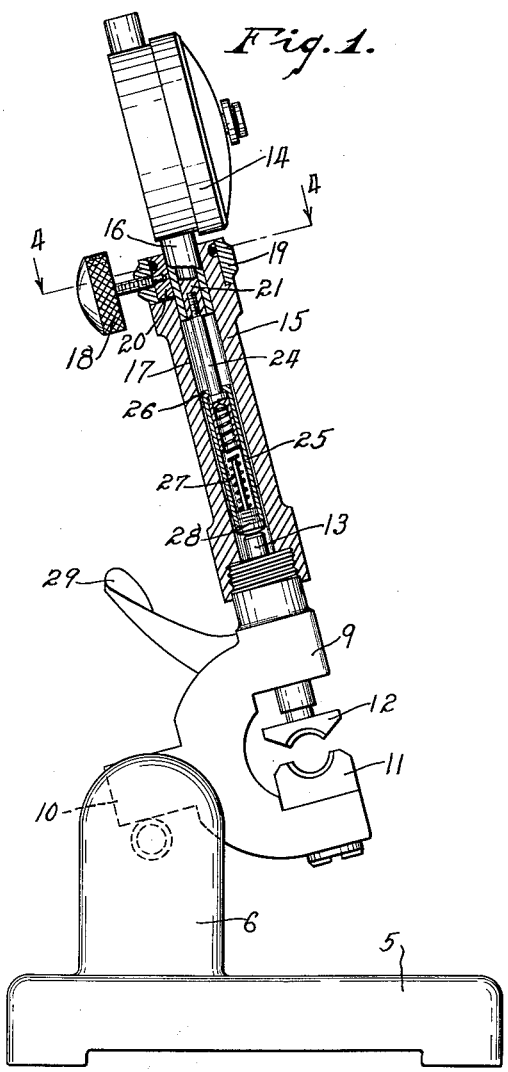
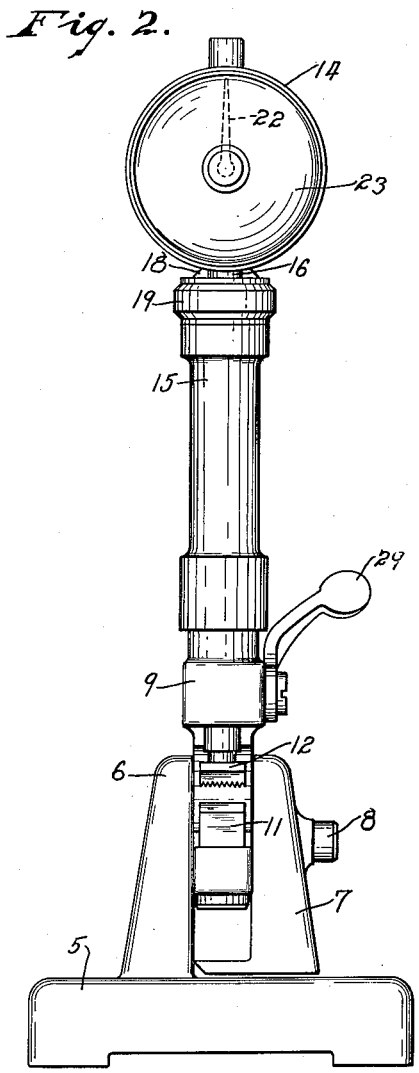
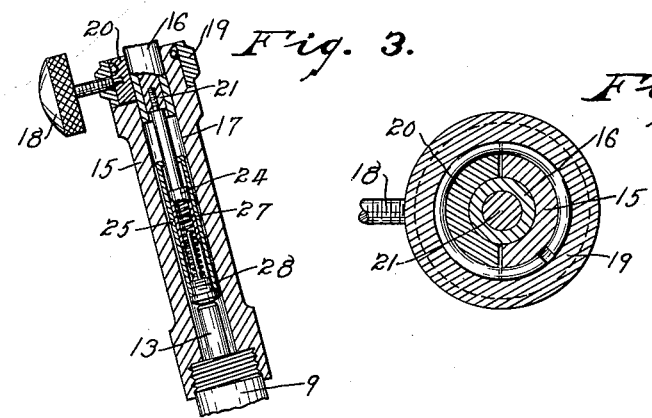
INVENTOR.
BROR W. SWANSON
BY
Louis V. Lucia
ATTORNEY Patented Mar. 11, 1952

2,588,586

UNITED STATES PATENT OFFICE 2,588,586

SCREW THREAD COMPARATOR

Bror W. Swanson, Elmwood, Conn., assignor, by mesne assignments, to Anthony F. Kasprow, Felix A. Kasprow, Joseph W. Kasprow, Stephen G. Kasprow, all of New Britain, and Meyer E. Bailey, New Haven, Conn.

Application June 8, 1949, Serial No. 97,855

3 Claims. (Cl. 33—147)

This invention relates to a screw thread comparator and more particularly to a gaging device for indicating the diameters of screw threads on manufactured parts as compared with that of a master screw thread.

It is an object of the present invention to provide a screw thread comparator which is highly efficient in its operation, accurate, easy to use, and one which can be manufactured for sale at a minimum cost in comparison with other devices of the same class.

A further object of this invention is to provide such a device with which may be used indicator instruments of conventional forms to thereby permit the adaptation of the desired indicator for a particular use of said comparators.

A still further object of this invention is to provide a comparator into which the threaded members to be compared may be inserted and gaged without causing excessive operation of the indicator.

Further objects and advantages of this invention will be more clearly understood from the following description and the accompanying drawing in which:

Fig. 1 is a side view of a comparator embodying my invention, certain parts thereof being shown in central vertical section.

Fig. 2 is an elevational front view of said gage in the vertical position.

Fig. 3 is a side view, in central vertical section, showing the position of a portion of the mechanism during a gaging operation of my comparator as a member to be gaged is inserted therein.

Fig. 4 is an enlarged plan view in section on line 4—4 of Fig. 1.

As shown in the drawings, the numeral 5 denotes a base having an upright 6 to which is secured a clamping member 7 by means of a clamping screw 8. My comparator includes a gaging device, such as described in my co-pending application, Serial No. 578,323, filed February 16, 1945, and my copending application Serial No. 23,732, filed April 28, 1948. In the form illustrated herein, the supporting member 9 is preferably constructed with flat parallel sides or surfaces and has a rearward extension 10 of equal thickness to permit the said member to be clamped between the upright portion 6 and the clamp 7, as illustrated in Fig. 2 of the drawings, and adjusted to different angles on the base for the convenience of the user.

As shown, a pair of gaging jaws are mounted to said supporting member; a fixed jaw 11 is secured to said member and a movable jaw 12 is carried on a shaft 13 which is slidably mounted in the supporting member 9.

The present invention is directed primarily to suitable means for providing a connection between said shaft 13 and an indicator 14 and which will permit lost motion whereby the distance traveled by the shaft 13 in a gaging operation may be greatly in excess of the distance traveled by the plunger of the indicator. The said mechanism preferably comprises a tubular hollow standard 15 and is threaded to the upper end of the supporting member 9 as illustrated.

The indicator 14 has a stem 16 which fits in the upper portion of the bore 17 of said supporting member and is clamped thereto by suitable means, such as a clamping screw 18 which is threaded to a clamping ring 19 and engages a split portion 20 of said hollow standard 15.

The said indicator is also provided with a plunger 21 which is slidable in the stem 16 and operates to rotate an indicating pointer 22 upon the face of the dial 23 of said indicator.

My invention provides an auxiliary stem or shaft 24 which is secured to the end of the plunger 21. A sleeve 25 is slidably carried on said auxiliary stem and is retained thereon by means of a shoulder and lip construction 26 which are normally urged into abutment by means of a spring 27 positioned between the stem 24 and an abutment stud 28 that is secured to the lower end of the sleeve 25 and abuts the plunger 13.

In the use of the device illustrated, when a member is to be inserted between the jaws 11 and 12 for a gaging operation, the lever 29 is operated to cause separation of the jaws 11 and 12, by raising the jaw 12, and thereby permitting the said member to be placed therebetween. The lever 29 is then released and the said jaws will close upon the member and the accuracy of the said member will be indicated by the pointer 22 on the dial 23.

In raising the jaw 12, the distance through which it must be raised to permit insertion of the threaded member to be gaged is greatly in excess of the distance afforded for the travel of the plunger 21 of the indicator. It being understood by those skilled in the art that such indicators, particularly those which are designed for very fine measurements, are constructed so that the plungers thereof will travel only a short distance, which distance is greatly multiplied for the rotation of the pointer 22. Therefore, the lost motion provided between the sleeve 25 and the shaft 24 allows the necessary movement of the plunger 13 to permit insertion of the threaded member to be gaged.

In the operation of the said device, when the jaw 12 is raised, the plunger 21 will rise for its relatively short distance and then come to a stop. However, the sleeve 25 will continue its upward movement against the tension of the spring 27, as clearly illustrated in Fig. 3 of the drawings. When the lever 29 is then released, the jaw 12 will be returned to its gaging position upon the member being gaged and the pointer 21 will indicate the accuracy of the thread diameter of the said member.

It is to be understood that the tension of the spring 27 is greater than the tension of the spring in the indicator 14, not shown, which urges the plunger 21 towards its normal position and thereby permits the shaft 24 and the sleeve 25 to act as a rigid member between the plunger 21 and the shaft 13 to permit accurate indication of the size of the member being gaged by the indicator 14. In other words, the lost motion connection provided between the shaft 13 and plunger 21 will be rigid up to the limit of the movement of the said plunger 21 and will be yielding beyond the said limit so as to permit the necessary operation of the jaws 11 and 12.

I claim:

1. In a screw thread comparator, a supporting member having a pair of parallel surfaces spaced from each other, a first jaw positioned adjacent one of said surfaces and fixedly supported thereon, a shaft arranged longitudinally of and mounted in said supporting member for movement toward and away from said first jaw and having one end extending through and beyond the other of said surfaces and having the other end projecting from said supporting member, a second jaw arranged in coacting relation with respect to said first jaw and carried by said one end of said shaft, a hollow standard surrounding the other projecting end of said shaft and having one end secured to said supporting member, a hollow sleeve slidably mounted within said standard and having one end engageable with the other projecting end of said shaft, a stem positioned within said standard and having one end slidably connected to the other end of said sleeve, an indicator having operating mechanism including a longitudinally extending movable element arranged longitudinally of and fixedly secured on the other end of said standard and having the movable element secured to the other end of said stem, resilient means disposed within said sleeve and operatively connected to said sleeve for urging said sleeve into engagement with said other end of said shaft, and hand actuable means exteriorly of said standard and operatively connected to said shaft for moving said sleeve toward said stem to thereby move said second jaw away from said first jaw.

2. In a screw thread comparator, a supporting member having a pair of parallel surfaces spaced from each other, a first jaw positioned adjacent one of said surfaces and fixedly supported thereon, a shaft arranged longitudinally of and mounted in said supporting member for movement toward and away from said first jaw and having one end extending through and beyond the other of said surfaces and having the other end projecting from said supporting member, a second jaw arranged in coacting relation with respect to said first jaw and carried by said one end of said shaft, a hollow standard surrounding the other projecting end of said shaft and having one end secured to said supporting member, a hollow sleeve slidably mounted within said standard and having one end engageable with the other projecting end of said shaft, a stem positioned within said standard and having one end slidably connected to the other end of said sleeve, an indicator provided with a hollow depending stem positioned adjacent the other end of said standard and having its hollow stem extending into and secured to the other end of said standard, operating mechanism for said indicator including a plunger slidably supported in said hollow stem and fixedly connected to the other end of said first named stem, resilient means disposed within said sleeve and operatively connected to said sleeve for urging said sleeve into engagement with said other end of said shaft, and hand actuable means exteriorly of said standard and operatively connected to said shaft for moving said sleeve toward said first named stem to thereby move said second jaw away from said first jaw.

3. In a screw thread comparator, a supporting member having a pair of parallel surfaces spaced from each other, a first jaw positioned adjacent one of said surfaces and fixedly supported thereon, a shaft arranged longitudinally of and mounted in said supporting member for movement toward and away from said first jaw and having one end extending through and beyond the other of said surfaces and having the other end projecting from said supporting member, a portion of said supporting member adjacent the projecting end of said shaft being externally threaded, a second jaw arranged in coacting relation with respect to said first jaw and carried by said one end of said shaft, a hollow standard surrounding the other projecting end of said shaft and having one end internally threaded and in threaded engagement with the externally threaded portion of said supporting member, a hollow sleeve slidably mounted within said standard and having one end engageable with the other projecting end of said shaft, a stem positioned within said standard and having one end slidably connected to the other end of said sleeve, an indicator having operating mechanism including a longitudinally extending movable element arranged longitudinally of and fixedly secured on the other end of said standard and having the movable element secured to the other end of said stem, resilient means disposed within said sleeve and operatively connected to said sleeve for urging said sleeve into engagement with said other end of said shaft, and hand actuable means exteriorly of said standard and operatively connected to said shaft for moving said sleeve toward said stem to thereby move said second jaw away from said first jaw.

BROR W. SWANSON.

REFERENCES CITED

The following references are of record in the file of this patent:

UNITED STATES PATENTS

| Number | Name | Date |
|---|---|---|
| 1,152,761 | Provost | Sept. 7, 1915 |
| 1,863,673 | Schraven | June 21, 1932 |
| 2,181,077 | Street | Nov. 21, 1939 |
| 2,209,020 | Billman et al. | July 23, 1940 |
| 2,307,950 | Plaut et al. | Jan. 12, 1943 |
| 2,363,077 | Moore | Nov. 21, 1944 |
| 2,431,021 | Bourdelais | Nov. 18, 1947 |

FOREIGN PATENTS

| Number | Country | Date |
|---|---|---|
| 6,780 | Great Britain | May 6, 1915 |
| 229,450 | Switzerland | Jan. 17, 1944 |
| 339,507 | Germany | July 26, 1921 |

OTHER REFERENCES

American Machinist, page 131, Fig. 15; February 14, 1946.